Patented Sept. 4, 1951

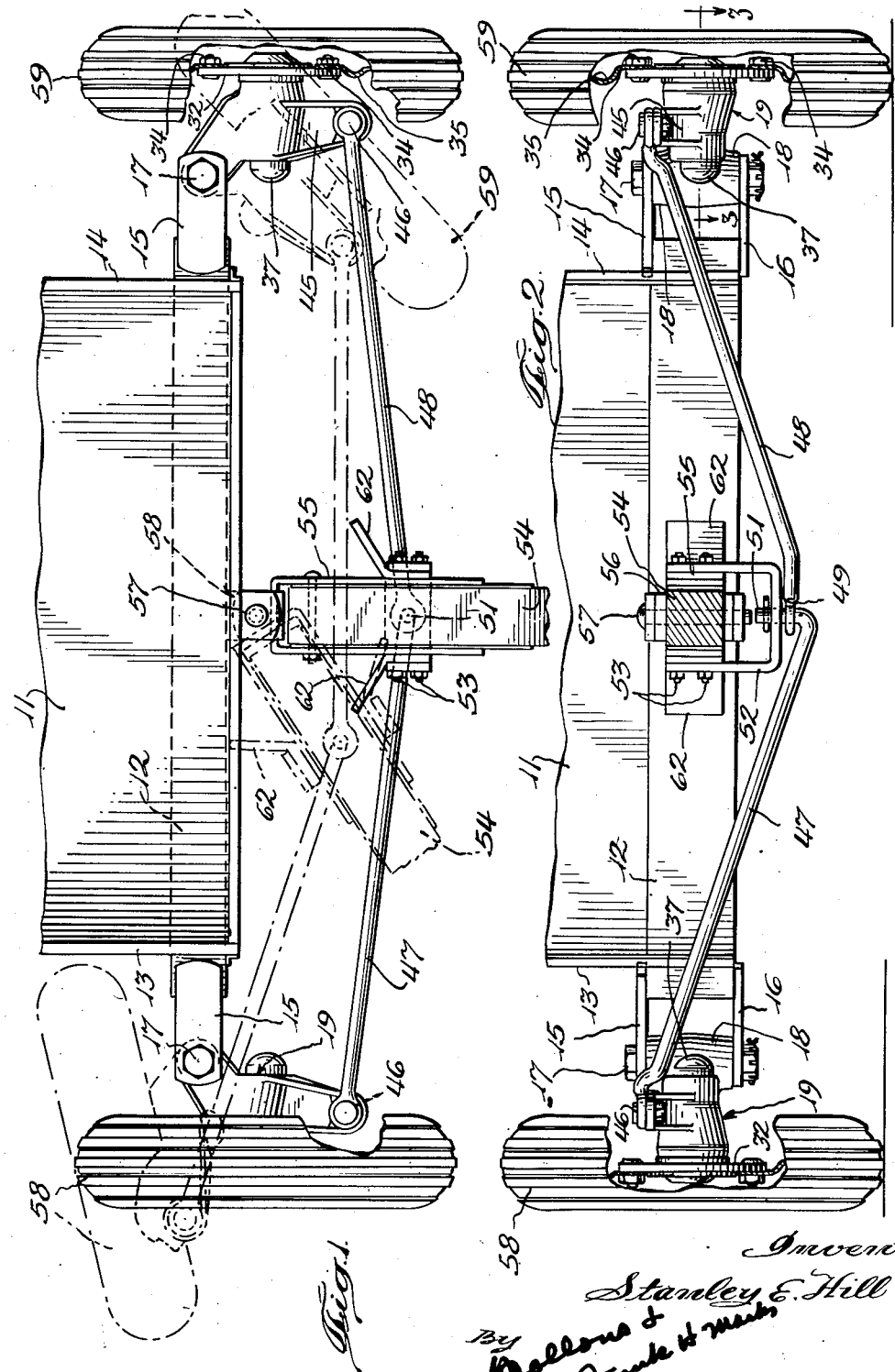

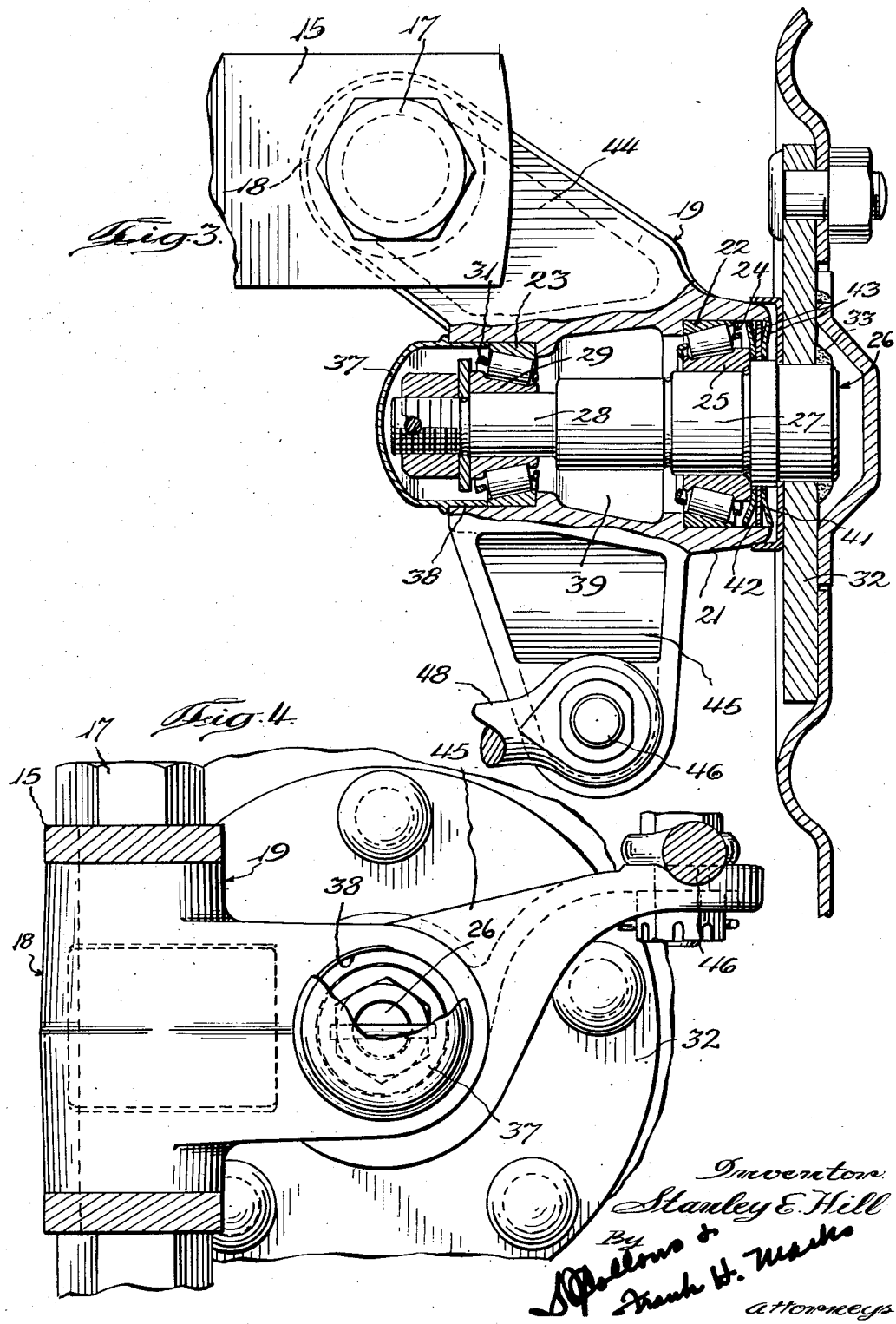

2,566,565

UNITED STATES PATENT OFFICE 2,566,565

VEHICLE STEERING KNUCKLE MECHANISM FOR EFFECTING SHARP TURNS

Stanley E. Hill, Kankakee, Ill., assignor to Sears, Roebuck and Co., Chicago, Ill., a corporation of New York Application December 23, 1947, Serial No. 793,455

1 Claim. (Cl. 280—103)

The present invention relates to vehicular axles and is concerned more particularly with a design of live axle construction which affords a wide range of maneuverability of advantage to trailer vehicles.

In certain classes of traction vehicles adaptable to farm use such as, for example, manure spreaders, ensilage trucks, etc., vehicular design is dictated to accommodate especially for sharp turning and irregularity in road surface by the provision of a low center of gravity and a wide steering angle. With this object in mind, the traction wheels of such vehicles are required to be disposed at one side of, rather than beneath, the truck structure. In pursuing these basic dictates, the present invention has evolved certain essential principles of axle bearing or journal embodiments whereby steering control is made to perform throughout sharper angles under conditions of more instantaneous response to traction, while yet maintaining safe distribution of weight and without requiring more than a minimum of moving parts.

In keeping with the aforementioned objectives, there is devised herewith a wheel suspension and axle design which permits the steering apparatus, including the wheels, to be closely disposed to the vehicular body and to utilize a minimum of space to afford a sharp turning angle not heretofore obtainable under comparable conditions.

Briefly stated, the principal object of the present invention is to provide a stub axle wheel system which will afford sturdy and ample journal support for heavily loaded implements and which can be regulated under short-length leverage control, so that the drawn vehicle may follow closely the tractor device or prime mover under a variety of conditions which will require a minimum of periodic servicing and attention. Also, by making the stub axle a separate member it may be produced under more economic manufacturing methods and at considerably lower cost than where it is integrated with an oddly shaped forging such as that of a staring knuckle.

For a more comprehensive understanding of this invention, reference will now be had to the accompanying drawings and to the following detailed specification in which like reference characters designate corresponding parts throughout, and in which:

Fig. 1 is a plan view of the front carriage of a drawn vehicle having embodied therein certain essential features which constitute the present invention;

Fig. 2 is a front elevational view of the structure featured in Fig. 1 in which portions have been broken away to better reveal the lixe axle details of construction;

Fig. 3 is an enlarged plan sectional view taken approximately on line 3—3 of Fig. 2 and featuring the structural embodiment of the live axle design which makes the unique achievements of the instant invention possible; and Fig. 4 is an enlarged side elevational view of th detail featured in Fig. 3 observed at right angles to its normal functioning position.

The reference numeral 11 designates a truck body such as may be employed in hauling farm grain, manure or any other bulky material under conditions of harvesting or during land conditioning. The rear of this vehicle may have one or two trailer wheels, the specific design and arrangement of which is not concerned in this disclosure.

Beneath the front end of the load box 11 there is indicated a supporting beam 12, Figs. 1 and 2, rigidly secured to the frame and under-structure and extending sidewardly beyond the limits of the box sides 13 and 14 at which are suitably integrated as by welding the trunnion plates 15 and 16, in vertical alignment. These plates are provided with apertures to receive the king pins 17 that pass through the enlarged hub 18 (see also Figs. 3 and 4) of each one of the front wheel supporting members generally designated 19.

The wheel castings or forgings 19 are shaped to afford a principal axle housing 21 of generally tapering proportions internally bored and ground to provide the proper diameters for receiving the outer bearing rings 22 and 23 of two sets of pin roller bearing races, one larger than the other as best revealed in Fig. 3.

The larger race 24 includes an inner ring 25 which should have snug fitting relationship with the axle stub 26 at its section 27 whose diameter is substantially larger than the diameter of the inner journaled portion 28. The latter has similar fitted relationship with the inner ring 29 of the smaller journal race 31.

Axle 26 is of comparatively short length for the express purpose of minimizing the space occupied by the overall structure, and it is to be noted that its principal support has been designed so as to be near the wheel supporting flange 32 which is welded as at 33 to a section of the axle of largest diameter located practically in planar alignment with the wheel center. Thus, it will be noted that the flange 32 which is bolted as at 34 to the disc 35 of each wheel is securely integrated with the axle so as to withstand shock incident to severe operating conditions.

The inner extremity of the journal embossment 21 is covered by a deep-seated sealing cup 37 that has drive-fitting engagement as at 38 with the bore of the inner race, and before this element is finally positioned, its concavity is filled with a grease type of lubricant such as may also be stored in the space 39 between the bearing races for the purpose of accommodating long periods of service before requiring replenishment.

In order that the grease supply may not work through beyond the large journal bearing 24, a grease retainer assembly 41 has been provided in which a fibrous packing 42 is confined between the metallic plates 43 that are drive-fitted into the opening after the manner well known in grease retainer construction. The king pin journal hub 18 is located at the extremity of an arm 44 which angles inwardly from the axle hub so that a relatively greater amount of journal support may be disposed within the width of the wheel. Control of the forging or casting 19 in respect to its king pin pivot is regulated through an integral arm 45 at the extremity of which there is a pivotal opening 46 whereby the arm is articulated to the outer end of a link 47 or 48, Figs. 1 and 2, which constitutes an element of a steering assembly. The two links 47 and 48 are joined at the longitudinal center of the vehicle where one of the links is provided with an eye 49, and the other with a pintle 51 that extends through the eye as well as through a yoke 52. Yoke 52 is made of a strap bolted as at 53 to the tongue or drawbar 54 whose end is saddled by a U-shaped re-enforcement that carries the clevis 56 journaled at 57 in an anchor bracket 58 mounted on the beam 12.

In order that the drawbar 54 may not be rotated too far, there are provided a pair of stop brackets 62, one on each side of the yoke 52. Each bracket extremity 62 is adapted to abut against beam 12 just as is shown in dotted outline in Fig. 1 when the tongue 54 has been rotated in a related direction to the extent thereat indicated.

By observing Fig. 1 wherein the front wheels 58 and 59 are shown in solid outline to be directed in vertical alignment for forward motion, it will be observed that the length of the combined links 47 and 48 or, otherwise stated, the distance between the control pivots 46 is greater than the distance between the king pin pivots 17. Consequently, the rotation of the draft tongue 54 in either direction to any extent up to the maximum as indicated in dotted outline as in this illustration will cause the wheels 58 and 59 to be rotated for turning, but at different degrees of rotation. The wheel 58 or 59 which is to assume the inner position of the circle of rotation will be noted to have been turned more nearly at right angles to the perpendicular main line of traction than the outer wheel of the circle of rotation, giving to a three or four wheeled vehicle a sharp angle of maneuverability while yet maintaining an even distribution and balance as well as stability. When the drawbar or tongue 54 is urged in a forward direction, the wheels 58 and 59 maintain parallelism, but when this bar is turned in either direction, the inner wheel in the circle of rotation turns farther than the outer wheel as has just been explained, and in so turning moves about its king pin more rapidly. This acceleration makes the drawn vehicle respond sharply to the influence of the traction vehicle, so that harvesting and manure spreading operations may be accomplished with greater facility and convenience as regards turning in small spaces and under difficult conditions of terrain.

While the present invention has been explained and described with reference to a more or less specific embodiment, it is to be understood, nevertheless, that numerous modifications and variations may be incorporated without departing from the essential spirit or scope thereof. It is, accordingly, not intended to be limited in an understanding of the invention by the details and illustrations of the accompanying drawings, nor by the specific language of the foregoing description except as indicated in the hereunto appended claim.

The invention claimed is:

A low center-of-gravity steering knuckle mechanism for accomplishing close-placement king pivoting to laterally disposed steering wheels which includes, a four wheeled draft vehicle having a transverse forward axle beam, pairs of trunnion plates integral with and extending laterally outward of said beam to constitute vertical pivot king pin journals, a pair of knuckle forgings one for each of said pairs of trunnion plates each comprising a king pivot sleeve receivable in the space between its pair of trunnion plates, an arm angling from each sleeve outwardly towards its wheel plane center, a horizontal journal hub merging with said arm in the proximity of its wheel center, said hub affording an internal bore consisting of a wheelside major diameter bearing seat and remote therefrom a minor diameter bearing seat, a steering arm jutting forwardly of each hub for articulation with a steering link system, and a live axle stub shaft welded to a wheel securement flange, one for each of said hubs, each shaft comprising a major diameter portion in close proximity to its flange and in registration transversely with said major diameter hub bearing seat, and a minor diameter portion spaced therefrom to register transversely with said minor diameter hub bearing seat.

STANLEY E. HILL.

REFERENCES CITED

The following references are of record in the file of this patent:

UNITED STATES PATENTS

| Number | Name | Date |
|---|---|---|
| 1,492,005 | Synck | Apr. 28, 1924 |
| 1,766,859 | Vincent | June 24, 1930 |
| 1,846,651 | Orelind | Feb. 23, 1932 |

FOREIGN PATENTS

| Number | Country | Date |
|---|---|---|
| 168,688 | Great Britain | Sept. 12, 1921 |